United States Patent
Motojima et al.

(10) Patent No.: US 7,367,354 B2
(45) Date of Patent: May 6, 2008

(54) CHECK VALVE

(75) Inventors: Junichi Motojima, Gunma (JP);
Masaaki Iijima, Gunma (JP)

(73) Assignee: Hitachi, Ltd., Tokyo (JP)

( * ) Notice: Subject to any disclaimer, the term of this patent is extended or adjusted under 35 U.S.C. 154(b) by 46 days.

(21) Appl. No.: 11/079,218

(22) Filed: Mar. 15, 2005

(65) Prior Publication Data

US 2005/0205135 A1 Sep. 22, 2005

(30) Foreign Application Priority Data

Mar. 17, 2004 (JP) ............................. 2004-076142

(51) Int. Cl.
*F16K 15/02* (2006.01)
(52) U.S. Cl. .................... 137/542; 137/540; 251/337; 267/180
(58) Field of Classification Search ............... 137/469, 137/494, 542, 543.23; 251/337; 267/166.1, 267/180
See application file for complete search history.

(56) References Cited

U.S. PATENT DOCUMENTS

| 1,815,612 | A | * | 7/1931 | Cataline et al. ............ 251/337 |
| 3,725,990 | A | | 4/1973 | Peterson et al. |
| 4,387,715 | A | | 6/1983 | Hakim et al. |
| 4,778,354 | A | * | 10/1988 | Idei ............................ 417/366 |
| 4,964,391 | A | * | 10/1990 | Hoover ....................... 123/510 |
| 5,107,890 | A | * | 4/1992 | Gute .......................... 137/539 |
| 6,971,405 | B2 | * | 12/2005 | Pickelman .................. 137/540 |
| 6,981,512 | B2 | * | 1/2006 | Meyer ...................... 137/15.22 |

FOREIGN PATENT DOCUMENTS

| DE | 24 49 994 A1 | 5/1975 |
| JP | 60 164079 A | 8/1985 |
| JP | 02 190681 A | 7/1990 |
| JP | 09 250417 A | 9/1997 |
| JP | 2775797 B2 | 5/1998 |

* cited by examiner

*Primary Examiner*—Ramesh Krishnamurthy
(74) *Attorney, Agent, or Firm*—Antonelli, Terry, Stout & Kraus, LLP.

(57) ABSTRACT

A check valve includes a housing formed with a valve hole through which fluid flows, a valve seat formed on the peripheral wall of the valve hole, a valve element disposed in the valve hole to be movable between a valve closed position where the valve element makes close contact with the valve seat to close the valve hole and a valve open position where the valve element moves away from the valve seat in the downstream direction to open the valve hole, a coil spring for biasing the valve element toward the valve closed position wherein the coil spring is larger in outer diameter than valve element, and a pressure acting portion provided to the coil spring so as to undergo the pressure of fluid.

13 Claims, 3 Drawing Sheets

CHECK VALVE

BACKGROUND OF THE INVENTION

The present invention relates to a check valve interposed, for example, in a discharge passage of a fuel pump to be opened and closed by the hydraulic pressure of fluid.

In motor vehicles, the check valve is interposed in a fuel passage for feeding fuel from the fuel pump to an internal combustion engine, and is in an open position during operation of the engine by the hydraulic pressure of fuel and in a closed position after engine stop due to no hydraulic pressure. By interposing the check valve in the fuel passage, the hydraulic pressure in the fuel passage is maintained at a predetermined value even after engine stop to allow immediate supply of fuel to the engine at engine restart.

A typical check valve is discloses in Japanese document JP-B2 2775797. This check valve is formed with a valve hole through which fuel or fluid flows, and comprises a housing formed on the outer peripheral surface of the valve hole and having a valve seat, a valve element disposed in the valve hole to be movable between a valve closed position where the valve element makes close contact with the valve seat to close the valve hole and a valve open position where the valve element moves away from the valve seat in the downstream direction to open the valve hole, a coil spring having one end engaged with the valve element and for biasing the valve element toward the valve closed position, and a valve holder for movably holding the valve element in the valve hole and with which another end of the coil spring is engaged.

The valve element comprises a semispherical valve head and a rod supported in a slide hole of the valve holder. The valve head has a surface covered with a seal member and an outer periphery integrated with a flange.

With the above structure, when a fuel pump starts to discharge fuel, the hydraulic pressure of fuel operates on the valve head of the valve element, with which the valve element is urged to move in the valve open position against a biasing force of the coil spring. At the instant that the valve element opens the valve hole, the lift is small, providing higher flow velocity of fuel flowing through a clearance between the valve element and the surface of the valve hole. Then, a hydraulic-pressure reduction occurs once at the surroundings of the valve element. With the valve element lifted even slightly, the hydraulic pressure operates also on the flange of the valve element. Therefore, the valve element undergoes a great pressing force resulting from the hydraulic pressure, surely moving to the valve open position against a biasing force of the coil spring.

Specifically, if the area of the valve element on which the hydraulic pressure acts is small, the valve element cannot completely move to the valve open position, causing occurrence of its vibration or oscillation and reduction in the pump efficiency due to pressure loss of fuel. In order to prevent such inconveniences, Japanese document JP-B2 2775797 proposes to arrange a flange with the valve element to increase the area on which the hydraulic pressure acts, thus surely moving the valve element to the valve open position.

SUMMARY OF THE INVENTION

When manufacturing the valve element, a unit of the flange and rod is integrally manufactured by forging or resin molding, on which the seal member such as fluoro-rubber is baked. When the valve element is obtained by forging, the flange cannot be formed with high accuracy, since the material runs off a flange corresponding spot during a forging process. Achievement of the high accuracy of the flange needs post-working, causing a problem of cost increase.

On the other hand, when the valve element is obtained by resin molding, the flange lacks strength during baking of the seal member, since the flange has small thickness.

It is, therefore, an object of the present invention to provide a check valve which allows sure operation of a valve element under the hydraulic pressure with reduced manufacturing cost.

Generally, the present invention provides a check valve, which comprises: a housing, the housing being formed with a valve hole through which a fluid flows; a valve seat formed on a peripheral wall of the valve hole; a valve element disposed in the valve hole, the valve element being movable between a first position where the valve element makes close contact with the valve seat to close the valve hole and a second position where the valve element moves away from the valve seat in a downstream direction to open the valve hole; a coil spring which biases the valve element toward the first position, the coil spring being larger in outer diameter than valve element; and a pressure acting portion provided to the coil spring, the pressure acting portion undergoing a pressure of the fluid.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
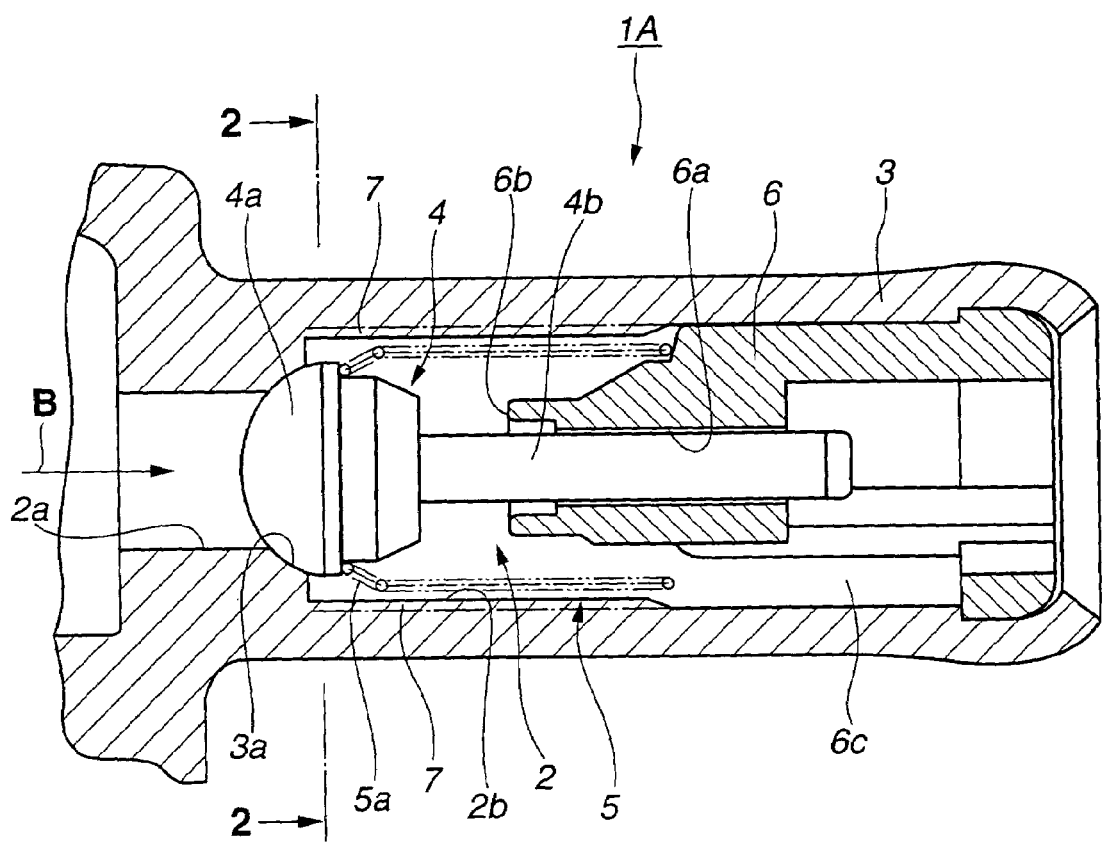
FIG. 1 is a longitudinal sectional view showing a first embodiment of a check valve according to the present invention.

Referring to the drawings wherein like reference numerals designate like parts throughout the views, a description will be made about preferred embodiments of a check valve according to the present invention.

Figure 2:
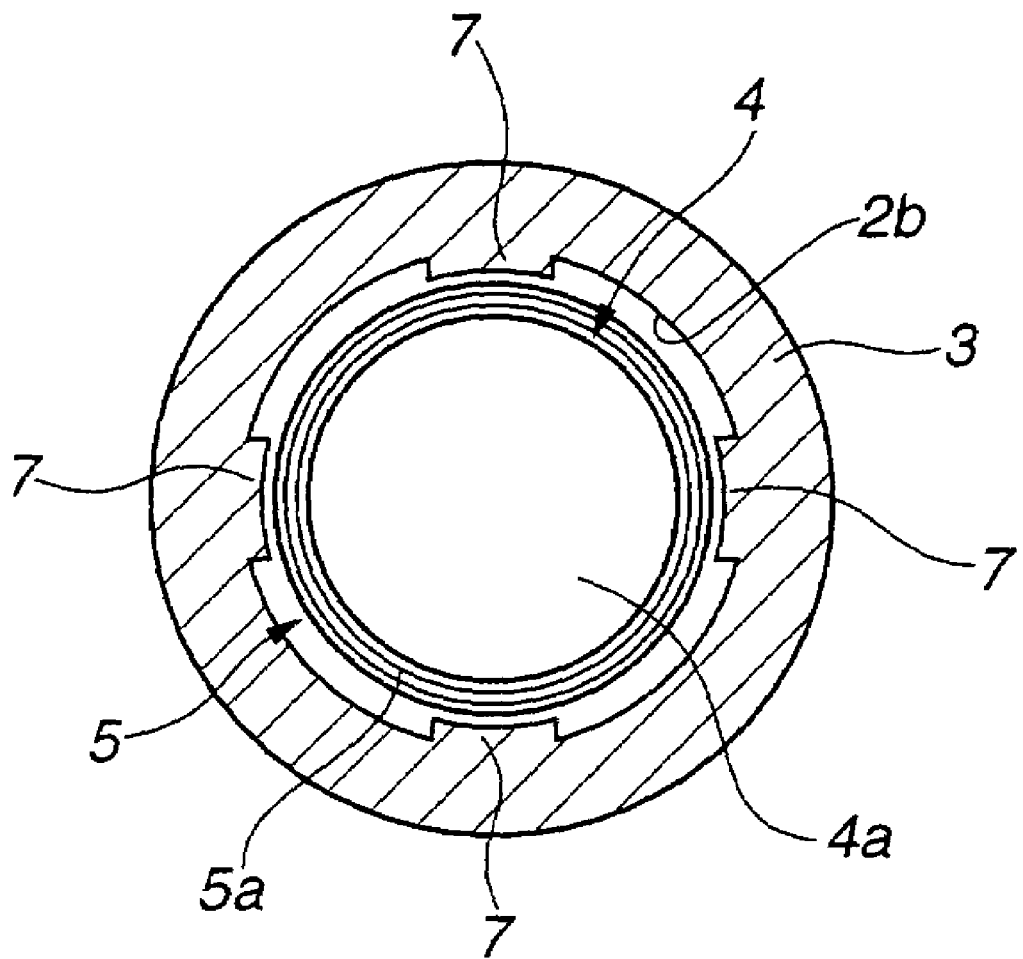
FIG. 2 is a cross sectional view taken along the line 2-2 in FIG. 1.

Referring to FIGS. 1 and 2, there is shown first embodiment of the present invention. A check valve 1A is formed with a valve hole 2 through which fuel or fluid flows, and comprises a housing 3 formed on the outer peripheral surface of valve hole 2 and having a valve seat 3a, a valve element 4 disposed in valve hole 2 to be movable between a valve closed position or first position (position shown in FIG. 1) where valve element 4 makes close contact with valve seat 3a to close valve hole 2 and a valve open position or second position where valve element 4 moves away from valve seat 3a in the downstream direction to open valve hole 2, a coil spring 5 having one end engaged with valve element 4 and for biasing valve element 4 toward the valve closed position, and a valve holder 6 for movably holding valve element 4 in valve hole 2 and with which another end of coil spring 5 is engaged.

Valve hole 2 has an upstream side connected to a fuel pump, not shown, and a downstream side connected to an internal combustion engine, not shown. Valve hole 2 comprises a small-diameter hole 2a and a large-diameter hole 2b continuously connected thereto, two holes 2a, 2b being formed circularly. A step located between small-diameter and large-diameter holes 2a, 2b serves as a valve seat 3a. Ribs 7 are arranged on the inner peripheral surface of large-diameter hole 2b at 90° intervals to protrude inward. A coil spring 5 is disposed adjacent to ribs 7, expanding/contracting motion of which is guided by ribs 7. A passage for fluid after passing through valve seat 3a is secured by a clearance between adjacent ribs 7.

Valve element 4 comprises a semispherical valve head 4a and a support rod 4b connected thereto. Valve head 4a and support rod 4b are formed of a metal such as brass, and valve head 4a has a surface covered with a rubber seal member, not shown.

Valve holder 6 is formed with a slide hole 6a in which support rod 4b of valve element 4 is urged to slide. Valve element 4 is guided by slide hole 6a to move between the valve closed position and the valve open position. Valve holder 6 comprises a stopper 6b. A position where valve head 4a of valve element 4 abuts on stopper 6b is set as valve open position. Valve holder 6 is also formed with a communication hole 6c through which the upstream side and downstream side of valve hole 2 with respect to valve holder 6 communicate with each other.

As described above, coil spring 5 has one end engaged with valve head 4a of valve element 4 and another end engaged with valve holder 6. Coil spring 5 has at one end a certain range in which coil spring 5 is formed like a reversed cone to gradually increase the outer diameter along a flow direction B of fuel. In other range, coil spring 5 is formed to have the same outer diameter. Specifically, one end of coil spring 5 is larger in outer diameter than valve head 4a of valve element 4, and serves as a pressure acting portion 5a on which the pressure of fuel acts. Adjacent sections of coil spring 5 are densely wound on pressure acting portion 5a with no clearance therebetween.

With the above structure, when the fuel pump starts to discharge fuel, the hydraulic pressure of fuel operates on valve head 4a of valve element 4, with which valve element 4 is urged to move in the valve open position against a biasing force of coil spring 6. At the instant that valve element 4 opens valve hole 2, the lift is small, providing higher flow velocity of fuel flowing through a clearance between valve element 4 and the surface of valve hole 2. Then, a hydraulic-pressure reduction occurs once at the surroundings of valve element 4. With valve element 4 lifted even slightly, the hydraulic pressure operates also on valve head 4a of valve element 4 and pressure acting portion 5a of coil spring 5. Specifically, by receiving the hydraulic pressure at valve head 4a of valve element 4 and pressure acting portion 5a of coil spring 5, valve element 4 undergoes a great pressing force, surely moving to the valve open position against a biasing force of coil spring 5. On the other hand, there is no need to provide a protrusion such as flange to valve element 4 itself as in the related art, valve element 4 can be manufactured readily accurately. And coil spring 5 of a desired shape can be manufactured readily accurately at low cost. This allows sure movement of valve element 4 to the valve open position by the hydraulic pressure, and manufacturing of check valve 1A at low cost.

In the first embodiment, adjacent sections of coil spring 5 are densely wound on pressure acting portion 5a with no clearance therebetween, resulting in achievement of great and stable hydraulic pressure acting on pressure acting portion 5a.

Further, in the first embodiment, since pressure acting portion 5a is formed like a reversed cone to gradually increase the outer diameter along flow direction B of fuel, fuel flowing between valve element 4 and the peripheral surface of valve hole 2 travels along the conical surface, resulting in achievement of smooth fuel flow.

Still further, in the first embodiment, since pressure acting portion 5a is arranged at one end of coil spring 5 engaged with valve element 4, pressure acting portion 5a is disposed in the vicinity of valve seat 3a, and thus can receive the hydraulic pressure with valve element 4 slightly lifted. Moreover, pressure acting portion 5a moves together with valve element 4, having the advantage of stabilized expanding/contracting motion of coil spring 5.

Figure 3:
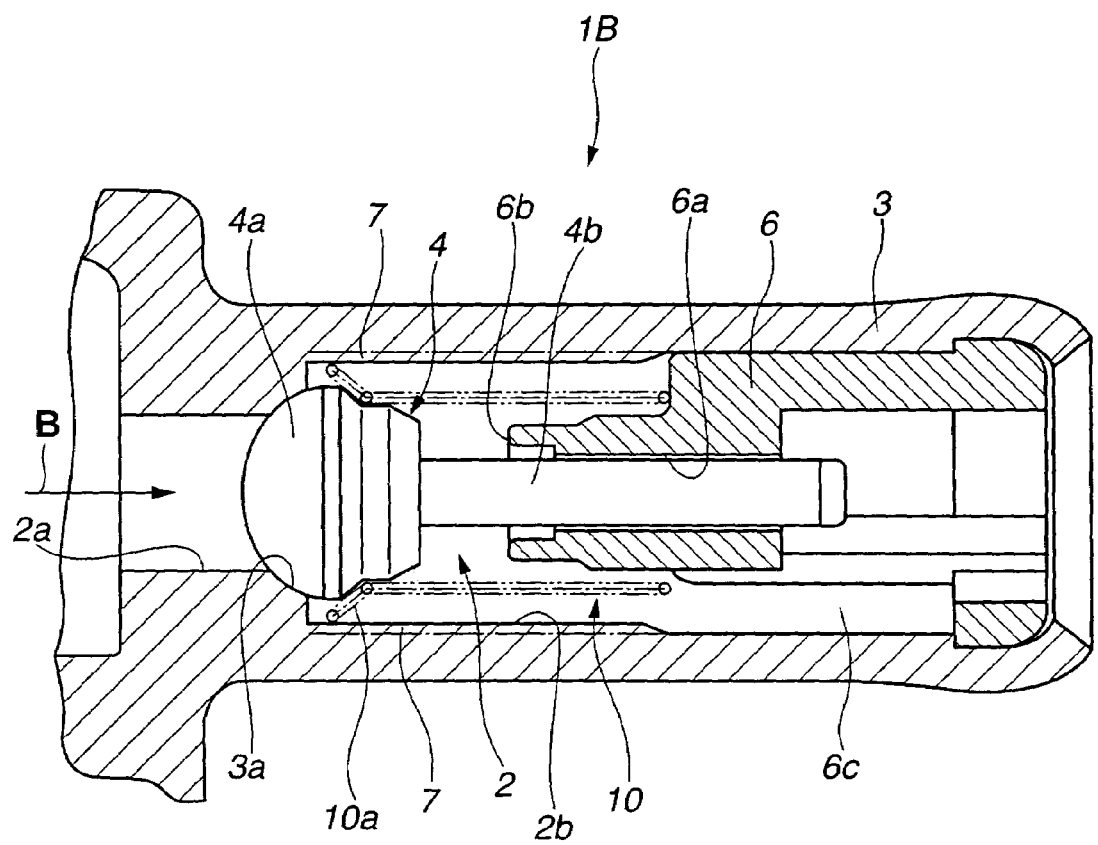
FIG. 3 is a view similar to FIG. 1, showing a second embodiment of the present invention.

Referring to FIG. 3, there is shown second embodiment of the present invention. A check valve 1B in the second embodiment differs from check valve 1A in the first embodiment in the structure of a coil spring 10 only.

Specifically, coil spring 10 has one end engaged, at its spot close thereto, with valve head 4a of valve element 4, and another end engaged with valve holder 6. Coil spring 10 has at one end a certain range in which coil spring 10 is formed like a taper to gradually decrease the outer diameter along flow direction B of fuel. In other range, coil spring 10 is formed to have the same outer diameter. Specifically, one end of coil spring 10 is larger in outer diameter than valve head 4a of valve element 4, and serves as a pressure acting portion 10a on which the pressure of fuel acts. Adjacent sections of coil spring 10 are densely wound on pressure acting portion 10a with no clearance therebetween.

The other structures of the second embodiment are the same as those of the first embodiment, the description of which is omitted accordingly.

The second embodiment produces the same operation and effect as those of the first embodiment, since the hydraulic pressure acts on both valve head 4a of valve element 4 and pressure acting portion 10a of coil spring 10.

The present invention can also be embodied in the following variations, which produce the same operation and effect as those of the illustrative embodiments.

In the illustrative embodiments, pressure acting portions 5a, 10a are provided to coil springs 5, 10 at one end on the side of valve head 4a of valve element 4. On the other hand, in the first variation, pressure acting portions 5a, 10a are provided to coil springs 5, 10 at a midpoint between one end and another end thereof.

Further, in the illustrative embodiments, pressure acting portions 5a, 10a are formed like a reversed cone or a taper to gradually vary the outer diameter along flow direction B of fluid. On the other hand, in the second variation, pressure acting portions 5a, 10a are formed to be orthogonal to flow direction B of fluid.

As described above, according to the present invention, when the hydraulic pressure of fuel operates on the valve element, with which the valve element is urged to move in the valve open position against a biasing force of the coil spring. At the instant that the valve element opens the valve hole, the lift is small, providing higher flow velocity of fuel flowing through a clearance between the valve element and the surface of the valve hole. Then, a hydraulic-pressure reduction occurs once at the surroundings of the valve element. With the valve element lifted even slightly, the hydraulic pressure operates also on the valve element and the pressure acting portion of the coil spring. Specifically, by receiving the hydraulic pressure at the valve element and the pressure acting portion of the coil spring, the valve element undergoes a great pressing force, surely moving to the valve open position against a biasing force of the coil spring. On the other hand, there is no need to provide a protrusion such as flange to the valve element itself, the valve element can be manufactured readily accurately. And the coil spring of a desired shape can be manufactured readily accurately at low cost. This allows sure movement of the valve element to the valve open position by the hydraulic pressure, and manufacturing of the check valve at low cost.

Further, according to the present invention, since adjacent sections of the coil spring are densely wound on the pressure acting portion with no clearance therebetween, resulting in achievement of great and stable hydraulic pressure acting on the pressure acting portion.

Still further, according to the present invention, fuel flowing between the valve element and the peripheral surface of the valve hole travels along the conical surface or the tapered surface, resulting in achievement of smooth fluid flow.

Furthermore, according to the present invention, the pressure acting portion is disposed in the vicinity of the valve seat, and thus can receive the hydraulic pressure with the valve element slightly lifted. Moreover, the pressure acting portion moves together with the valve element, having the advantage of stabilized expanding/contracting motion of the coil spring.

Having described the present invention in connection with the preferred embodiments, it is noted that the present invention is not limited thereto, and various changes and modifications can be made without departing from the scope of the present invention.

The entire teachings of Japanese Patent Application P2004-076142 filed Mar. 17, 2004 are hereby incorporated by reference.

What is claimed is:

1. A check valve, comprising:
   a housing, the housing being formed with a valve hole through which a fluid flows;
   a valve seat formed on a peripheral wall of the valve hole;
   a valve element disposed in the valve hole, the valve element being movable between a first position where the valve element makes close contact with the valve seat to close the valve hole and a second position where the valve element moves away from the valve seat in a downstream direction to open the valve hole; and
   a coil spring which biases the valve element toward the first position, the coil spring including a main body portion and a pressure acting portion which undergoes a pressure of the fluid, the pressure acting portion being larger in outer diameter than the valve element and wherein the pressure acting portion of the coil spring has adjacent sections of different diameter densely wound on the pressure acting portion with no clearance therebetween.

2. The check valve as claimed in claim 1, wherein the pressure acting portion is formed like a reversed cone to gradually increase an outer diameter along a flow direction of the fluid.

3. The check valve as claimed in claim 1, wherein the pressure acting portion is formed like a taper to gradually decrease an outer diameter along a flow direction of the fluid.

4. The check valve as claimed in claim 1, wherein the pressure acting portion is formed to be orthogonal to a flow direction of the fluid.

5. The check valve as claimed in claim 1, wherein the pressure acting portion is arranged at a first end of the coil spring, the first end being engaged with the valve element.

6. The check valve as claimed in claim 5, wherein the pressure acting portion is formed like a reversed cone to gradually increase an outer diameter along a flow direction of the fluid.

7. The check valve as claimed in claim 5, wherein the pressure acting portion is formed like a taper to gradually decrease an outer diameter along a flow direction of the fluid.

8. The check valve as claimed in claim 5, wherein the pressure acting portion is formed to be orthogonal to a flow direction of the fluid.

9. The check valve as claimed in claim 1, wherein the pressure acting portion is arranged at a midpoint between the first and second ends of the coil spring.

10. The check valve as claimed in claim 5, wherein the pressure acting portion is arranged at a midpoint between the first and second ends of the coil spring.

11. A check valve, comprising:
    a housing, the housing being formed with a valve hole through which a fluid flows;
    a valve seat formed on a peripheral wall of the valve hole;
    a valve element disposed in the valve hole, the valve element being movable between a first position where the valve element makes close contact with the valve seat to close the valve hole and a second position where the valve element moves away from the valve seat in a downstream direction to open the valve hole; and
    means for biasing the valve element toward the first position, the biasing means including a main body portion and a pressure acting portion which undergoes a pressure of the fluid, the pressure acting portion being larger in outer diameter than the valve element and wherein the pressure acting portion of the coil spring has adjacent sections of different diameter densely wound on the pressure acting portion with no clearance therebetween.

12. The check valve as claimed in claim 11, wherein the biasing means comprises a coil spring.

13. The check valve as claimed in claim 11, wherein the pressure acting portion is arranged at a first end of the coil spring, the first end being engaged with the valve element.

* * * * *